United States Patent
Koike et al.

[11] Patent Number: 5,993,173
[45] Date of Patent: Nov. 30, 1999

[54] TURBOCHARGER

[75] Inventors: Takaaki Koike, Hachiouji; Yukio Takahashi, Sodegaura, both of Japan

[73] Assignee: Ishikawajima-Harima Heavy Industries Co., Ltd., Tokyo, Japan

[21] Appl. No.: 08/806,942

[22] Filed: Feb. 26, 1997

[30] Foreign Application Priority Data

Mar. 6, 1996 [JP] Japan ................................ 8-049247
Mar. 6, 1996 [JP] Japan ................................ 8-049248

[51] Int. Cl.⁶ .................................................. F02B 39/00
[52] U.S. Cl. ............................................................ 417/407
[58] Field of Search ............................... 417/405, 407

[56] References Cited

U.S. PATENT DOCUMENTS

| | | | |
|---|---|---|---|
| 3,390,926 | 7/1968 | Woollenweber | 417/407 |
| 3,811,741 | 5/1974 | McInerney et al. | |
| 3,969,804 | 7/1976 | MacInnes et al. | 417/407 |
| 4,025,134 | 5/1977 | Reisacher | |
| 4,240,678 | 12/1980 | Sarle et al. | |
| 4,613,288 | 9/1986 | McInerney | 417/407 |

FOREIGN PATENT DOCUMENTS

| | | |
|---|---|---|
| 0 395 826 | 11/1990 | European Pat. Off. |
| 2 449 820 | 9/1980 | France |
| 24 03 768 | 8/1975 | Germany |
| 407 665 | 9/1966 | Switzerland |
| WO86/06790 | 11/1986 | WIPO |

OTHER PUBLICATIONS

Patent abstract of Japanese Publication No. 07139363 dated May 30, 1995.

*Primary Examiner*—Michael Koczo
*Attorney, Agent, or Firm*—McCormick, Paulding & Huber LLP

[57] ABSTRACT

A turbocharger includes a main housing (1) for housing a turbine rotor (2) and a compressor impeller (4). An independent bearing box (23) is provided in the main housing (1). The main housing (1) is comprised of a turbine housing (3) and a compressor housing (5). A rotating shaft (7) connecting the turbine rotor (2) with the compressor impeller (4) is supported by a semi-float metal bearing (24) placed in the bearing box (23). An oil passage (26) is formed in the main housing (1) for feeding an oil to inside and outside of the semi-float metal bearing (24) in the bearing box (23). Oil grooves (37) are formed in end faces of the metal bearing (24) and another grooves (34) are formed at end faces of the bearing box (23) for discharging the oil from the semi-float metal bearing (24). Oil flow in the turbocharger housing (1) is controlled by the oil grooves (34, 37).

10 Claims, 4 Drawing Sheets

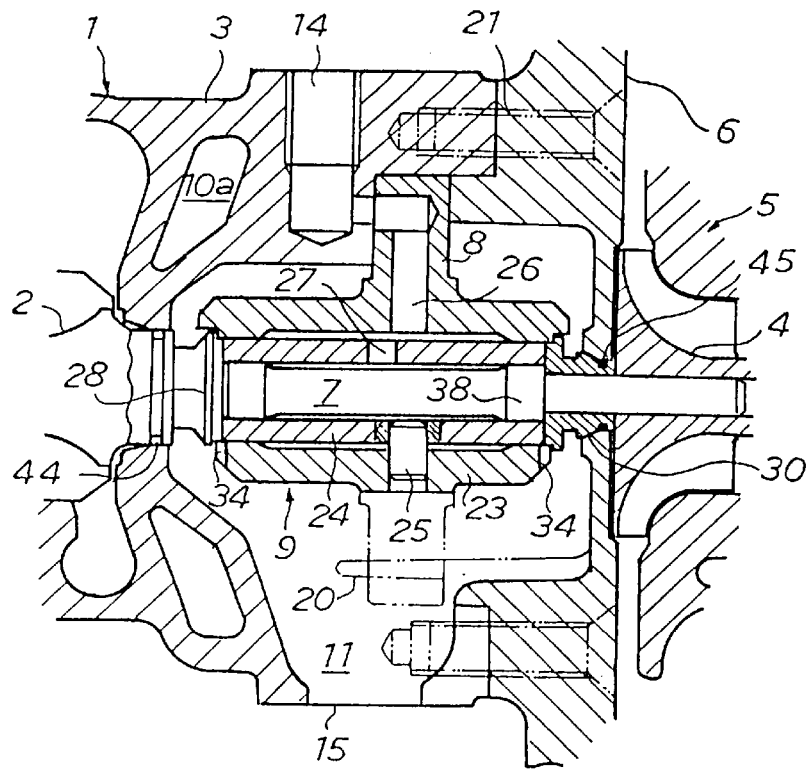
FIG. 1
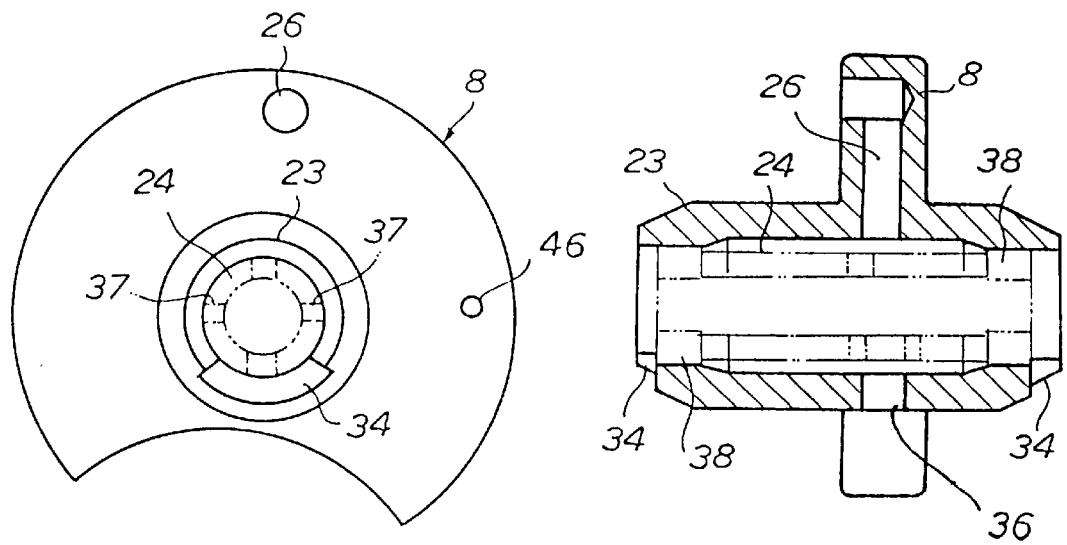
FIG. 2A
FIG. 2B ized by a

TURBOCHARGER

CROSS REFERENCE TO RELATED APPLICATION

Some of the subject matter herein is disclosed in the U.S. Patent Application entitled "TURBOCHARGER AND METHOD OF MAKING SAME", U.S. Ser. No. 08/770,677, filed Dec. 20, 1996, abandoned, and owned by the present assignee, the entire disclosure of which is incorporated herein by reference.

BACKGROUND OF THE INVENTION

1. Technical Field

The present invention generally relates to a turbocharger and more particularly to an improvement of a structure for feeding oil to a bearing unit supporting a rotating shaft in a turbocharger housing and an improvement of a structure for supporting a semi-float bearing of the bearing unit in the turbocharger housing.

2. Background Art

Generally, a turbocharger housing is comprised of three major parts, i.e., a turbine housing, a compressor housing and a bearing housing. A typical example of such a turbocharger housing is illustrated in FIG. 6 of the accompanying drawings. As depicted, the turbocharger housing y includes a turbine housing b for housing a turbine rotor a, a compressor housing d for housing a compressor impeller c and a bearing housing g for housing a set of bearings f supporting a rotating shaft e. The shaft e connects the turbine rotor a with the compressor impeller c.

The turbine housing b and the bearing housing g are fixedly aligned by a pin h provided at their interface k. An outer periphery of the interface k is firmly held by a clamp i. The bearing housing g and the compressor housing d are joined with each other by a bolt j.

The bearing set f includes a plurality of journal bearings f1 and a thrust bearing f2. The journal bearings f1 are rotatably fitted in a shaft bore formed in the bearing housing g. The shaft e extends through the shaft bore. The thrust bearing unit f2 is provided at the right end of the shaft bore. Each of the journal bearings f1 is a cylindrically-shaped, full-float bearing which is rotatable in the rotating shaft bore of the bearing housing g. The journal bearings f1 support a radial force. The thrust bearing f2 includes a first ring-shaped bearing member fa secured to the rotating shaft e and a second bearing member fb engaged over the first bearing member fa and fixed to the bearing housing g. The thrust bearing f2 supports a thrust force.

In the illustrated turbocharger housing y, the journal bearings f1 and the thrust bearing f2 are assembled in the bearing housing g such that the number of necessary parts is large and the assembly process is troublesome and time consuming. In addition, a degree of freedom in designing oil feeding and discharging passages and spaces for the bearings f1 and f2 is quite limited due to needed accuracy and the shape of the core used in a molding process, as well as structure and locations of the bearings f1 and f2.

Particularly in case of a small turbocharger, it is impossible to design oil passages and spaces which can optimally control flow of a lubrication oil in the bearing housing g.

In order to simplify the assembling process, to reduce the number of necessary parts and to provide a controlled flow of oil in the turbocharger housing y, it is proposed to separate the bearing housing from the turbocharger housing y and to employ a semi-float bearing unit (metal bearing) which functions as both the journal and thrust bearings instead of the full float bearing. This simplifies the assembling process, reduces the number of necessary parts and provides a larger freedom in designing the oil passages and spaces in the turbocharger housing. Specifically, an independent bearing box is prepared separately, and a semi-float metal bearing is provided in the bearing box in such a manner that it can move in a radial direction and is fixed in axial and radial directions relative to the bearing box. This one-piece, semi-float bearing supports the rotating shaft in a full float manner and bears a thrust load.

However, this semi-float bearing has the following drawbacks. The semi-float bearing supports thrust loads at its ends so that the oil flow is more unstable than conventional structures on both the turbine and compressor sides. Accordingly, the lubrication oil tends to flow to sealing members provided between the turbine rotor and the rotating shaft (or bearing box) and between the compressor impeller and the rotating shaft (or bearing box). Thus, the desired oil discharge flow is not realized.

Furthermore, the semi-float bearing is generally secured onto the turbocharger housing by a thrust pin. However, the semi-float bearing is made from a soft material, such as copper, which provides an excellent bearing property, so that the semi-float bearing is easy to wear at the point of linear contact between the thrust pin and the semi-float bearing.

Another known turbocharger housing is disclosed in, for example, Japanese Patent Application Laid-Open Publications Nos. 7-139363 and 7-150962.

SUMMARY OF THE INVENTION

One object of the present invention is to provide a turbocharger housing which does not have the above described problems.

Another object of the present invention is to provide a turbocharger housing of a type having a semi-float bearing to support a rotating shaft, which is characterized by a sealing structure with an improved oil discharge property.

Still another object of the present invention is to provide a turbocharger housing of a type having a semi-float bearing supported by a thrust pin, which is characterized by a semi-float bearing support structure having an improved wear resistance.

According to one aspect of the present invention, there is provided a turbocharger comprising a main housing for housing a turbine rotor and a compressor impeller, a bearing box provided in the main housing, a rotating shaft connecting the turbine rotor with the compressor impeller, a semi-float metal bearing placed in the bearing box for supporting the rotating shaft, an oil passage formed in the main housing for feeding oil to the inside surface and the outside surface of the semi-float metal bearing inside the bearing box, and oil discharge means formed at ends of the bearing box for discharging the oil from the semi-float metal bearing.

The main housing may include a turbine housing for housing the turbine rotor, a compressor housing for housing the compressor impeller and a sealing plate provided between the turbine housing and the compressor housing. The bearing box may be supported by the sealing plate and the turbine housing.

A thrust load supporting member may be provided at the back of the compressor impeller. The semi-float metal bearing may have a first end face which is in contact with an enlarged portion of the turbine rotor formed at a back of the turbine rotor and a second end face which is in contact with the thrust load supporting member. A plurality of oil grooves are formed in the first and second end faces of the semi-float metal bearing for introducing the oil flowing between the rotating shaft and the metal bearing into the oil discharge means.

The oil discharge means may be a pair of grooves formed in end faces of the cylindrical bearing box. Each of the grooves may have an arch shape.

A thrust pin may be fixed to the bearing box for supporting the semi-float metal bearing and a hard ring may be fixed to the semi-float metal bearing for engaging with the thrust pin. The semi-float metal bearing journally supports the rotating shaft and bears a thrust load at the same time since it is supported by the bearing box 23 via the thrust pin 25.

The metal bearing may be made from a soft material such as copper or copper alloy and the hard ring is made from a hard material such as a stainless steel or iron alloy. The hard ring contacts the hard thrust pin so that wear of the bearing metal is prevented.

The hard ring may have a slit so that it can shrink in a peripheral direction and reduce its diameter for easier installation.

BRIEF DESCRIPTION OF THE ACCOMPANYING DRAWINGS

FIG. 1 illustrates a sectional view of a major part of a turbocharger according to the present invention;

FIG. 2A is a left side cross sectional view of a bearing unit shown in FIG. 1;

FIG. 2B is a front sectional view of the bearing unit, which is extracted from FIG. 1 and illustrated in an enlarged scale;

DETAILED DESCRIPTION OF THE PREFERRED EMBODIMENTS

Preferred embodiments of the present invention will be described with reference to FIGS. 1 to 5 of the accompanying drawings.

Figure 5:
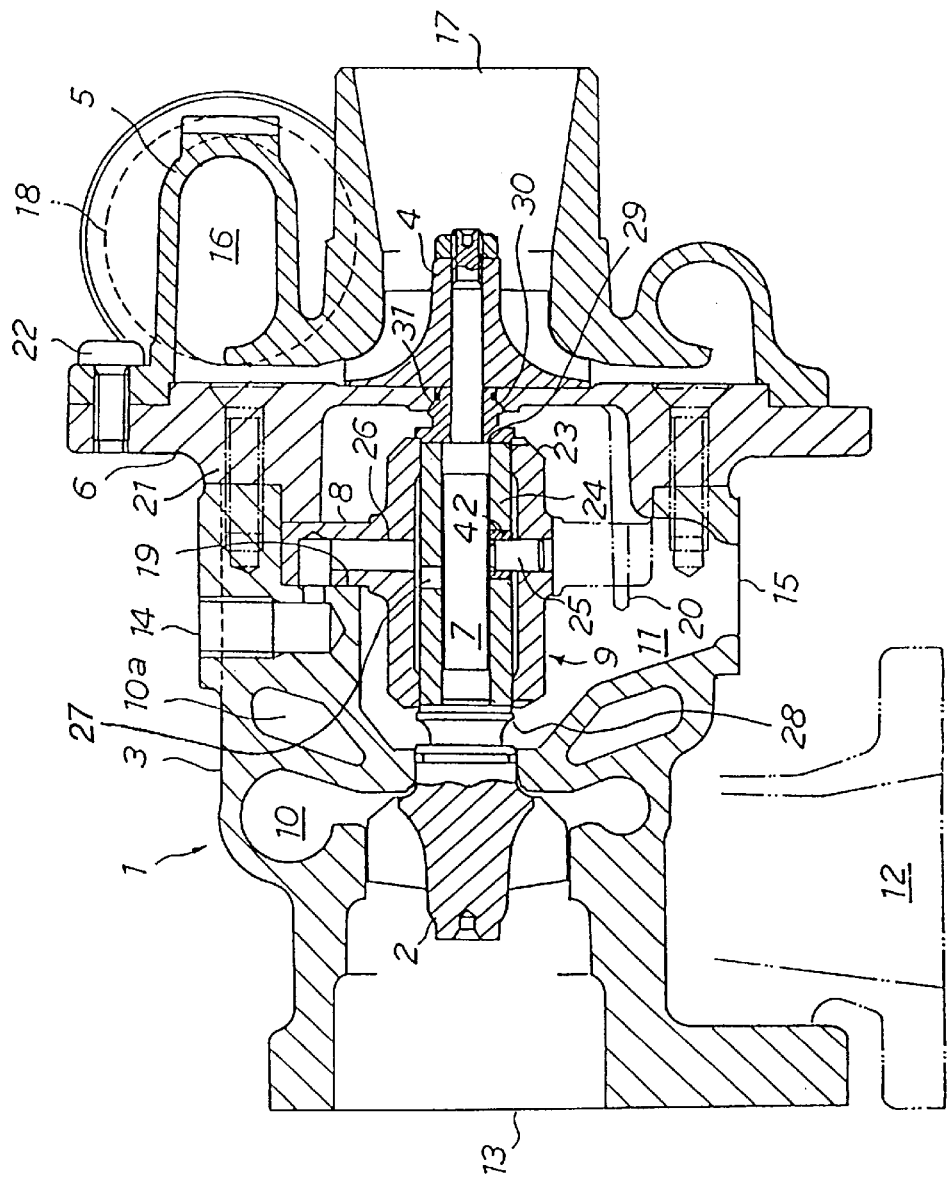
FIG. 5 illustrates an overall cross sectional view of the turbocharger according to the present invention.
Figure 6:
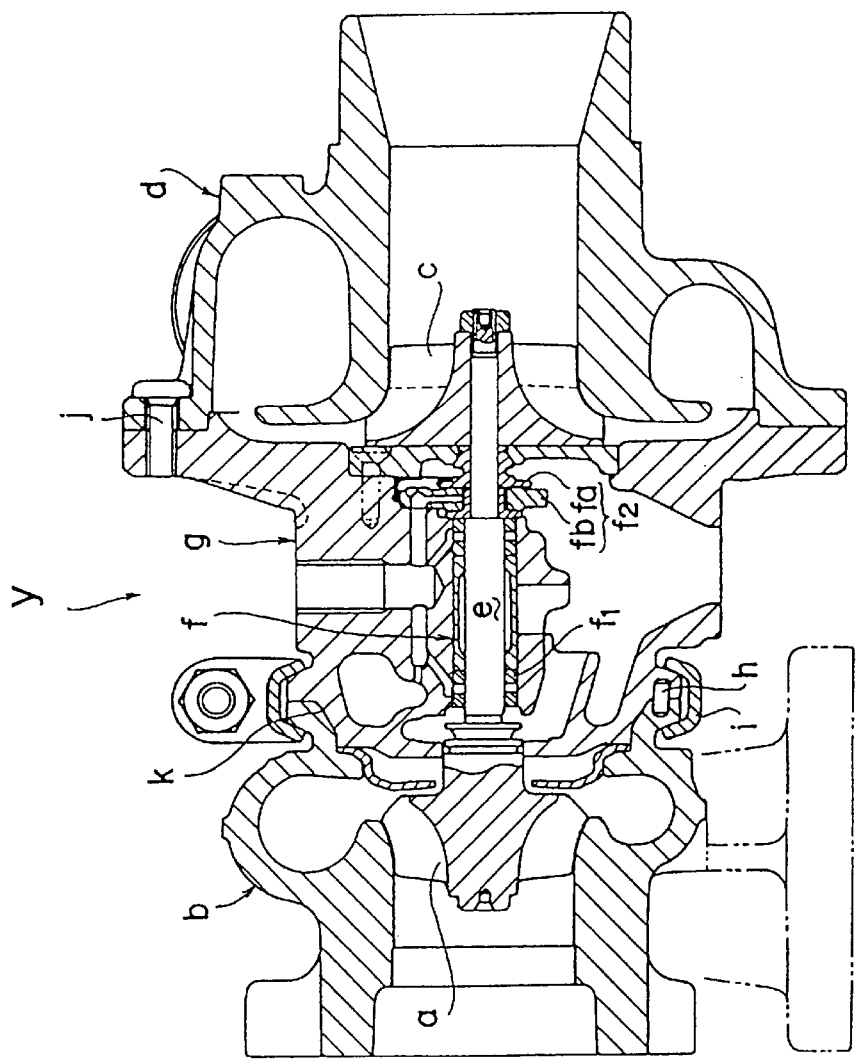
FIG. 6 depicts a cross section of a conventional turbocharger.

Referring first to FIG. 5, a fundamental construction of a turbocharger according to the present invention is described.

A turbocharger housing 1 includes a turbine housing 3 for housing a turbine rotor 2 and a compressor housing 5 for housing a compressor impeller 4. A sealing plate 6 is interposed between the turbine housing 3 and the compressor housing 5.

The turbine rotor 2 is coupled with the compressor impeller 4 by a rotating shaft 7. The rotating shaft 7 is supported by a bearing unit 9. The bearing unit 9 includes a bearing box 23 having a radial flange-like member 8 which is clamped between the turbine housing 3 and the sealing plate 6.

The turbine housing 3 for the turbine rotor 2 includes a scroll chamber 10 formed around the turbine rotor 2, a bearing chamber 11 for housing the bearing unit 9, an exhaust gas inlet 12 for introducing an exhaust gas to the scroll chamber 10, an exhaust gas outlet 13 for discharging the exhaust gas which is fed to the turbine rotor 2 from the scroll chamber 10, a cooling water passage 10a for heat insulation of the back of the scroll chamber 10, an oil inlet 14 for introducing an oil into the bearing chamber 11 and an oil outlet 15 for discharging the oil from the bearing chamber 11.

In the compressor housing 5, a second scroll chamber 16 is formed around the compressor impeller 4. An air inlet 17 opens in an axial direction of the impeller 4 and an air outlet 18 extends from the second scroll chamber 16.

The bearing box 23 is fitted in a stepwise recess 19 formed in the back of the turbine housing 3. A positioning pin 20 is inserted into the bearing box 23 to fix the position of the bearing box 23. The sealing plate 6 is placed over the bearing box 23 and secured to the turbine housing 3 by bolts 21.

The compressor housing 5 is bolted onto the sealing plate 6 using screws 22.

The bearing unit 9 includes a generally cylindrical bearing box 23 and a semi-float metal bearing 24 housed in the bearing box 23 for supporting the rotating shaft 7. A thrust pin 25 provided in the bearing box 23 allows the metal semi-float bearing 24 to move in a radial direction. Axial and rotational movements of the semi-float metal bearing 24 are prohibited by the thrust pin 25.

The bearing box 23 has an oil feed passage 26 for introduction of an oil into the bearing box 23 from the oil inlet 14 of the turbine housing 5. The semi-float metal bearing 24 has a through hole 27 for leading the oil to the rotating shaft 7 from the oil passage 26.

The shaft 7 is assembled in the bearing unit 9 in the following manner. A thrust supporting member 30 is fitted over the shaft 7 from the right until it contacts a stepwise portion 29 of the shaft 7. Then, the shaft 7 integrally having the turbine rotor 2 at its left end is inserted into the gas outlet 13 of the turbine housing 3 until a right end enlarged portion 28 of the turbine rotor 2 (FIG. 1) abuts a left end face of the thrust semi-float metal bearing 24. The thrust supporting member 30 naturally fits in a thrust supporting face 31 of the sealing plate 6. Alternatively, the thrust supporting member 30 may be fitted over the shaft 7 after the shaft 7 is inserted into the bearing unit 9 and before the sealing plate 6 is later attached to the turbine housing 3.

The semi-float metal bearing 24 joins the turbine rotor 2 with the compressor impeller 4 since its left end abuts the enlarged portion 28 of the turbine rotor 2 and its right end abuts the thrust supporting member 30. The semi-float metal bearing 24 journally supports the rotating shaft 7 and bears a thrust load at the same time since it is supported by the bearing box 23 via the thrust pin 25.

In the illustrated embodiment, the bearing box 23 is provided inside the turbocharger housing 1. The bearing box 23 has a fan-shaped flange 8 (FIG. 2A). The semi-float metal bearing 24 is housed in the bearing box 23 and the rotating shaft 7 is supported by the metal bearing 24.

Now referring to FIGS. 1, 2A and 2B, oil discharge grooves 34 are formed at both lower ends of the bearing box 23. These grooves 34 are each made by, for example, cutting away the end faces of the bearing box 23 in an arch shape.

Figure 3:
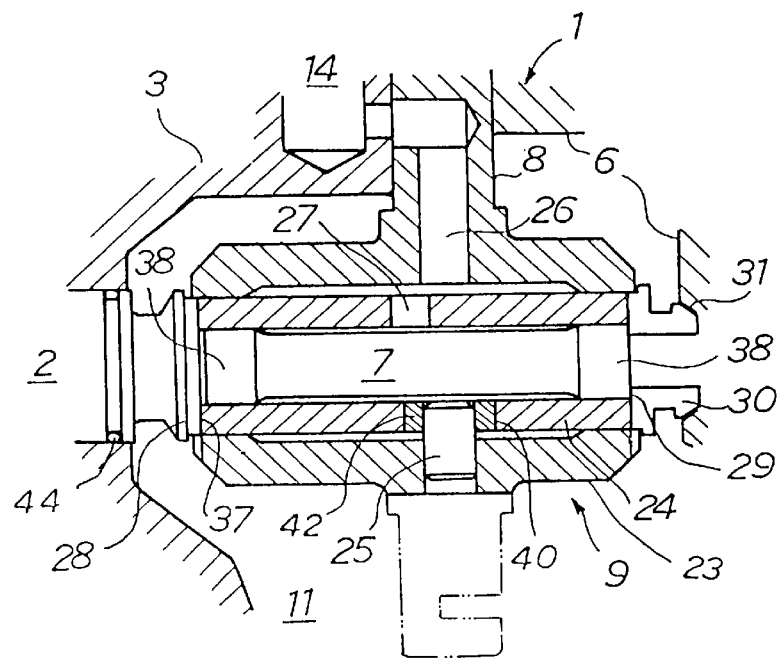
FIG. 3 is an enlarged cross section of the most important part of the turbocharger shown in FIG. 1.
Figure 4A:
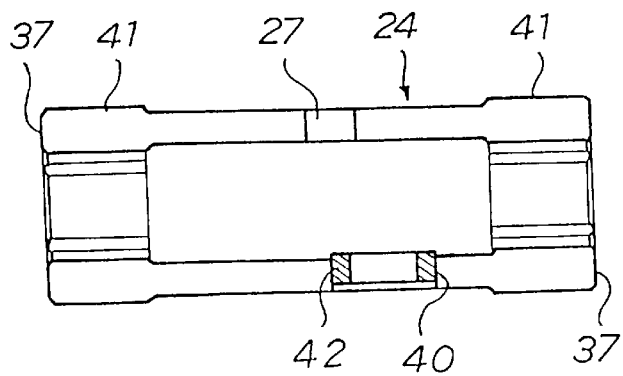
FIG. 4A is an enlarged view of a semi-float bearing shown in FIG. 1.
Figure 4B:
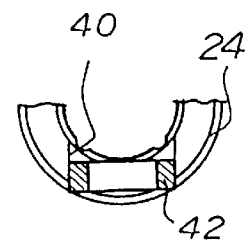
FIG. 4B illustrates a partial transversal cross section of the semi-float bearing shown in FIG. 4A.

The metal semi-float bearing 24 is made from a relatively soft material such as copper or a copper alloy. The metal bearing 24 has a plurality of oil grooves 37 at both ends as illustrated in FIGS. 2A and 4A. In the illustrated embodiment, four radial grooves 37 are formed in each end face of the metal bearing 24. The rotating shaft 7 has journal portions 38 at longitudinal ends thereof. These journal portions 38 have a larger diameter than other parts of the shaft 7 and contact the end portions of the metal bearing 24 as shown in FIG. 1. The oil fed inside the metal bearing 24 creates an oil film at the journal portions 38 to journally support the rotating shaft 7. The oil then flows into the oil grooves 37 and in turn to the oil discharge grooves 34. Therefore, the oil lubricates the contact between the enlarged portion 28 of the turbine rotor 2 and the left journal portion 38 of the shaft 7, the contact between the metal bearing 24 and the bearing box 23, and the contact between the thrust supporting member 30 and the left journal portion 38 of the shaft 7; the metal bearing 24 and the bearing box 23, thereby bearing thrust loads of the rotating shaft 7. Ultimately, the oil drops into the bearing chamber 11 below the bearing unit 9. Accordingly, control of the oil flow is realized. As a result, oil sealing on both the rotor and compressor sides is appropriately insured.

One of the oil discharge grooves 34 formed at both ends of the bearing box 23 is illustrated in FIG. 2A. It should be noted that the illustrated oil discharge groove 34 has an arc shape of about 110 degrees, but it may have up to a 180-degree arc as viewed from the center of the end face of the bearing box 23. Numeral 46 in FIG. 2A designates an opening formed in the flange 8 of the bearing box 23 for receiving the positioning pin 20. The upper end of the oil passage 26 opens in the bearing box flange 8 as illustrated in FIG. 2A. It is communicated with a lower end of the oil inlet 14 as illustrated in FIGS. 1 and 2B.

Referring to FIG. 2B, a bore 36 is formed in the bearing box 23. As understood from FIG. 3, the thrust pin 25 is inserted in this bore 36 and secured therein such that, approximately, the upper half of the thrust pin 25 projects from the bore 36. The metal bearing 24 has a larger opening 40 at a corresponding position, which is coaxial to the bore 36. A hard ring 42 having an inner diameter slightly larger than the bore 36 is fitted in the opening 40 so that the projecting upper half of the thrust pin 25 is loosely received in the ring member 42.

The metal bearing 24 has larger diameter portions 41 at its longitudinal ends as best seen in FIG. 4A. These portions 41 are radially supported by the bearing box 23.

The ring member 42 fitted in the bore 40 of the metal bearing 24 is made from a hard material such as stainless steel or iron alloy. Although not shown, the ring member 42 has a slit so that it can shrink in a radial direction and reduce its diameter upon grasping. This allows manual insertion of the ring member 42 into the mating bore 40. Alternatively, the ring member 42 may have a complete ring shape with no slit and it may be press-fitted in the bore 40, or the ring member 42 may be provided in the bore 40 during a molding process of the bearing metal 24 (i.e., insert molding).

The thrust pin 25 is a solid member in the preferred embodiment. However, it may be a spring pin. Further, the thrust pin 25 may have a shape other than as illustrated in the present embodiment. For example, a groove may be formed in an inner surface of the bearing box 23 and a first ring adapted to fit in the groove may be used instead of the thrust pin 25. In this case, a second ring having a mating groove may be provided on an outer surface of the metal bearing 24 instead of the ring 42 such that the second ring may engage with the first ring. Combination of such first and second rings allows the metal bearing 24 to rotate, and the metal bearing 24 only bears a thrust load.

The contact between the turbine rotor 2 and the turbocharger housing 1 is sealed by a first seal ring 44 as illustrated in FIG. 1. The contact between the thrust supporting member 30 and the sealing plate 6 is sealed by a second seal ring 45. Unlike the conventional turbocharger, the oil fed from the oil inlet 14 in the present invention does not flow to these seal rings 44 and 45 excessively since the oil discharge passages are determined by the grooves 37 and 34 and the oil discharge route is thereby controlled.

The rotating shaft 7 is journally supported by the metal bearing 24 and the thrust load exerted by the rotating shaft 7 is also born by the metal bearing 24 by way of the large diameter portion 28 of the turbine rotor 2 and the thrust supporting member 30. The thrust load is in turn supported by the bearing box 23 via the ring member 42 and the thrust pin 25. It should be noted that the thrust pin 25 is loosely fitted in the ring member 42 so that a small amount of radial movement of the metal bearing 24 is permitted. The ring member 42 and the thrust pin 25 are both made from a hard material so that the duration of the bearing unit 9 is extended. Particularly, even if the semi-float bearing moves in an undesired or unexpected manner due to the thrust load or the like, the hard ring 42 contacts the thrust pin 25 so that the longevity of the bearing unit 9 is insured.

As mentioned earlier, the oil fed from the inlet 14 of the turbocharger housing 1 flows in the oil passage 26 of the bearing box 23 and reaches the inside surface and outside surface of the metal bearing 24 supported in the bearing box 23. The oil flowing over the outer surface of the metal bearing 24 and the oil flowing under the metal bearing 24 from the oil bore 27 form in combination oil films over the journally supported portions 38 of the rotating shaft 7. Then, the oil proceeds to the oil feeding grooves 37 formed in the end faces of the metal bearing 24 so that it lubricates the contact between the large diameter portion 28, the left end face of the shaft 7, the bearing box 23 and the metal bearing 24, and between the thrust supporting member 30, the right end face of the shaft 7, the bearing box 23 and the metal bearing 24.

It is possible to select an optimal material for the metal bearing 24 without taking into account hardness and strength of the metal bearing 24.

What is claimed is:

1. A turbocharger comprising:

a main housing (1) for housing a turbine rotor (2) and a compressor impeller (4);

a bearing box (23) provided in the main housing (1) and having two annular end portions;

a rotating shaft (7) connecting the turbine rotor (2) with the compressor impeller (4);

a semi-float metal bearing (24) placed in the bearing box (23) for supporting the rotating shaft (7) and having two annular end faces each located adjacent a respective one of the two annular end portions of the bearing box and forming annular interfaces between the bearing box and the metal bearing;

an oil passage (26) formed in the main housing (1) and bearing box (23) for feeding an oil to a radially inside surface and a radially outside surface of the semifloat metal bearing (24) in the bearing box (23);

closure members (28, 30) for closing each of the two annular interfaces between the bearing box and the semi-float metal bearing along at least half of the annular extents of the interfaces so as to form oil films of high pressure around the radially inside and outside surfaces of the semi-float metal bearing (24); and oil discharge means (34) formed at each of the annular end portions of the bearing box (23), and located along the annular extents of the interfaces between the bearing box and the metal bearing not closed by the associated closure member, for discharging the oil from the semi-float metal bearing (24).

2. The turbocharger of claim 1, wherein the main housing (1) includes a turbine housing (3) for housing the turbine rotor (2), a compressor housing (5) for housing the compressor impeller (4) and a sealing plate (6) provided between the turbine housing (3) and the compressor housing (5), whereby the bearing box (23) is supported by the sealing plate (6) and the turbine housing (3).

3. The turbocharger of claim 2, wherein the bearing box (23) has a generally cylindrical shape, the semi-float metal bearing (24) has a generally cylindrical shape having a central portion of a first diameter, and end portions of a larger diameter than said central portion, whereby the larger diameter portions (41) of the metal bearing (24) are journally supported by the bearing box (23).

4. The turbocharger of claim 3, wherein the semi-float metal bearing (24) has a first end face which is in contact with one of the closure members (28) and a second end face which is in contact with the other closure member (30), and a plurality of oil groves (37) are formed in the first and second end faces of the semi-float metal bearing (24) for introducing the oil flowing between the rotating shaft (7) and the metal bearing (24) into the oil discharge means (34).

5. The turbocharger of claim 4, wherein the oil discharge means (34) comprise an arch-shaped groove formed in a respective end portion of the cylindrical bearing box (23).

6. The turbocharger of claim 1, wherein the closure members comprise a thrust load supporting member (30) provided at the back of the compressor impeller, and an enlarged portion (28) of the turbine rotor (2) formed at the back of the turbine rotor.

7. The turbocharger of claim 4, wherein one of the closure members comprises a thrust load supporting member (30) provided at the back of the compressor impeller, and the other closure member comprises an enlarged portion (28) of the turbine rotor (2) formed at the back of the turbine rotor.

8. A turbocharger bearing structure comprising:

a bearing box (23) having two annular end portions;

a semi-float metal bearing (24) with radially inner and outer surfaces placed in the bearing box (23) for supporting a rotating shaft (7) and having two annular end faces each located adjacent a respective one of the two annular end portions of the bearing box and forming annular interfaces between the bearing box and the metal bearing;

a lubrication oil passage (26) formed in the bearing box (23) for feeding a lubrication oil to the radially inner and outer surfaces of the semi-float metal bearing (24); and closure means (28, 30) for closing each of the two interfaces between the bearing box and the metal bearing along at least half and less than all of the annular extents of the interfaces to limit discharge of the lubrication oil from the interfaces and to form high pressure oil films around the radially inner and outer surfaces of the semi-float metal bearing (24).

9. The turbocharger bearing structure of claim 8, wherein the bearing box (23) has a generally cylindrical shape, the semi-float metal bearing (24) has a generally cylindrical shape having enlarged diameter portions (41) at its longitudinal ends, and said enlarged diameter portions are journally supported by the bearing box.

10. The turbocharger bearing structure of claim 9, wherein said closure means comprise a thrust supporting member (30) mounted on the rotating shaft (7) and a surface (28) of a turbine rotor (2) mounted on one end of the rotating shaft.

* * * * *